Figure 1:
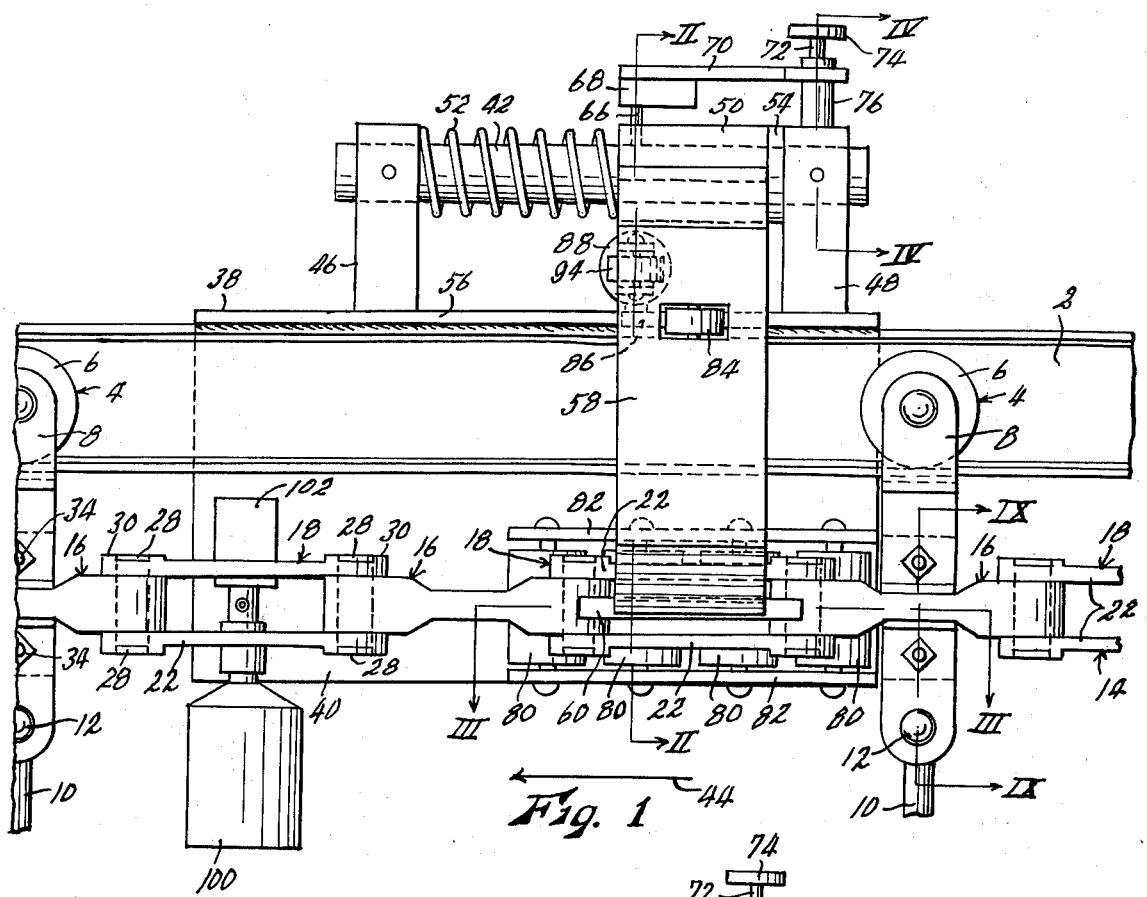

United States Patent [19]
Stinnett

[11] 3,998,317
[45] Dec. 21, 1976

[54] WEAR DETECTOR FOR CONVEYOR CHAINS

[76] Inventor: Arvil L. Stinnett, 712 S. 104th, Edwardsville, Kans. 66111

[22] Filed: July 30, 1975

[21] Appl. No.: 600,446

[52] U.S. Cl. .................. 198/341; 116/114 A; 198/468
[51] Int. Cl.² ......................... B65G 43/00
[58] Field of Search .......... 198/40, 232; 116/114 Q

[56] References Cited
UNITED STATES PATENTS

| | | | |
|---|---|---|---|
| 2,985,283 | 5/1961 | Carter | 198/232 |
| 3,241,666 | 3/1966 | Preu | 198/40 X |

*Primary Examiner*—Johnny D. Cherry
*Assistant Examiner*—Douglas D. Watts
*Attorney, Agent, or Firm*—John A. Hamilton

[57] ABSTRACT

A wear detector for conveyor chains consisting of a tapered gauge member insertable laterally of the chain into an open link of the chain, its degree of entry being governed by the effective internal length of the link, which is in turn governed by the wear of the chain links or the pins connecting the links, and a device operable by entry of the gauge member more than a predetermined degree into the chain to give a signal, or to mark the worn link, or both. The detector functions effectively on a continuously moving conveyor chain, and its sensitivity may be easily adjusted to indicate any desired degree of chain wear.

10 Claims, 10 Drawing Figures

WEAR DETECTOR FOR CONVEYOR CHAINS

This invention relates to new and useful improvements in devices for detecting and indicating worn links in conveyor chains, and has as its principle object the provision of a device which will continuously and repetitively check each link of a chain for wear, and which will give a signal whenever it detects a link which has become worn beyond a predetermined safe limit, or which will mark or index each worn link in order that all worn links may be easily located for replacement or repair during the next period the conveyor is out of service.

Chain conveyor systems are of course in extremely wide and popular usage, especially in assembly-line operations, such as in automobile assembly plants, wherein successive operations are performed on some workpiece as it is transported by the conveyor past successive work stations. This type of operation is too widespread and well known to require further detailed explanation. However, a common problem in such systems is that of wear of the links of the conveyor chain. As wear occurs, the effective length of each link, and consequently that of the total chain loop, increases, but since such chain loops are almost invariably equipped at some point with a spring-loaded take-up wheel to keep the chain taut regardless of wear, the wear is not apparent except in general movement of the take-up wheel, and even this of course does not pinpoint nor indicate which of the possibly thousands of links of the chain have actually become worn. If the wear is allowed to continue until some link actually fails and the chain parts, serious consequences can result. At the least, the assembly line must be shut down until repairs can be made, which often requires several hours. In a highly integrated assembly line operation, this idles perhaps hundreds of workers, and the economic losses can be severe. Also, many conveyor lines have sections which are more or less steeply inclined, and the breakage of the chain allows all workpieces on the inclines to roll or travel to the bottoms of the inclines. This can result in extremely costly damage, for example if the workpieces are automobiles in various stages of assembly and may also constitute an extreme hazard to life and limb to men working on the line. The prevention of these hazards, both economic and physical, is the primary object of this invention.

Generally, this object is accomplished by the provision of a device operable to gauge or "feel" the effective length of each chain link as it moves past a detector station at some convenient point on the line. This "effective" length of the link, as measured by the axial length of its interior opening, increases with advancing wear of its end connections to adjoining links, and when it exceeds an amount predetermined to represent a maximum "safe" degree of wear, the device emits a signal. The "feeling" of the link length is accomplished by a gauge member inserted transversely into the link opening, said gauge member being tapered so that its degree of insertion is variable according to the internal length of the link opening, and the signal device operates whenever the insertion exceeds a predetermined amount.

Another object is the provision of a wear detector of the character described which functions effectively in connection with a continuously moving conveyor chain. In this connection, the gauge member is mounted so as to be movable not only transversely of the chain to engage in the chain links, but also in the direction of chain movement, so as to "follow" the chain. Also, there are provided cam means for disengaging the gauge laterally from the chain after it has made its "reading", and spring means for returning it to its original position longitudinally of the chain, in order that it may "read" the next successive link.

Since it would be totally impractical in most cases to shut the line down for repairs each time a worn link is detected, and since in most cases the actual repairs must be performed at some point of the line remote from the detector station, a further object is the provision of means for automatically marking, as by a spray of colored paint or the like, each worn link as it is detected. In this manner, all of the worn links detected in a single work period may be repaired or replaced during the next normal down period.

A still further object is the provision of a wear detector of the character described which is adjustable in sensitivity, that is, it may be adjusted to detect and indicate links worn to any desired degree.

Other objects are simplicity and economy of construction, efficiency and dependability of operation, and adaptability for use in connection with conveyor chains of a wide variety of types and styles.

Figure 3:
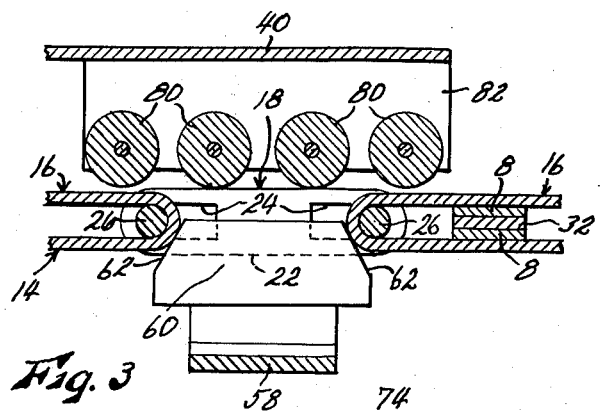
Figure 2:
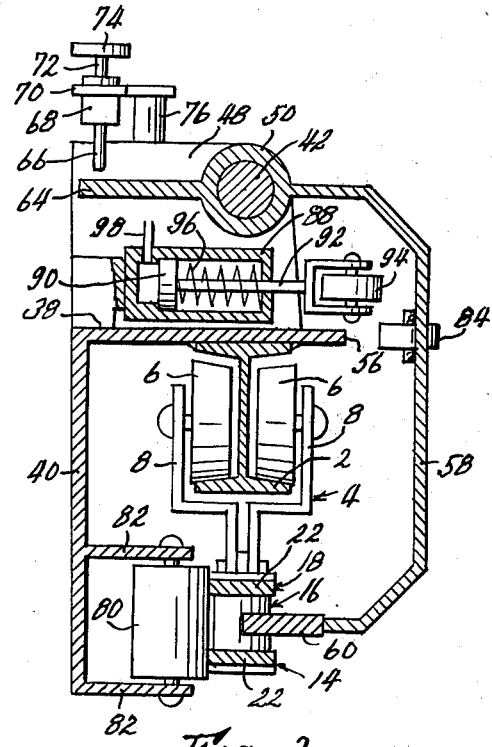
Figure 4:
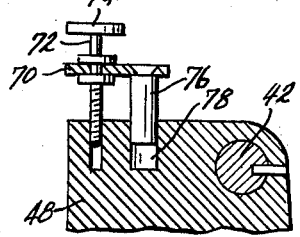
Figure 5:
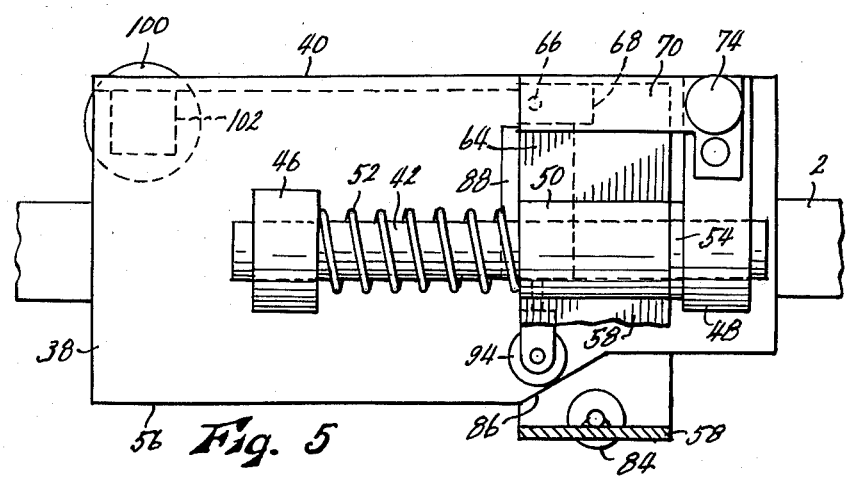
Figure 6:
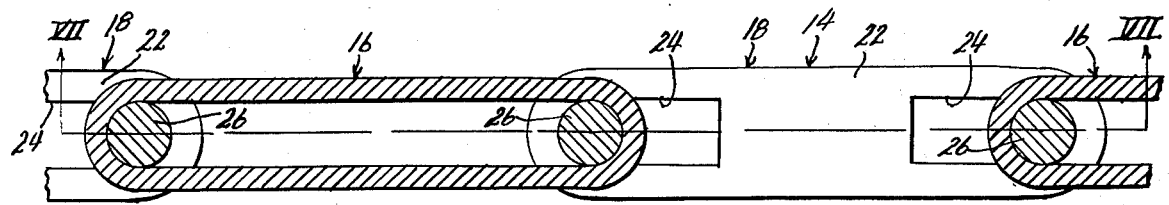
Figure 7:
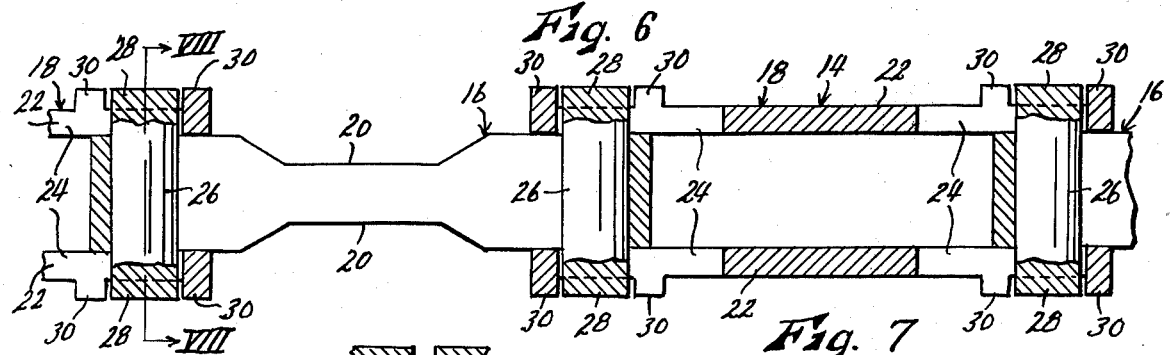
Figure 8:
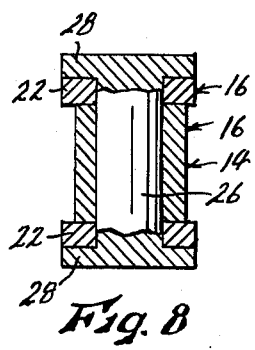
Figure 9:
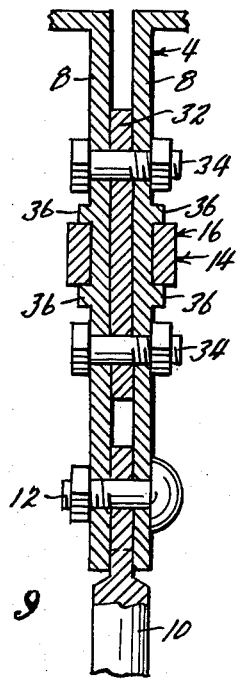
Figure 10:
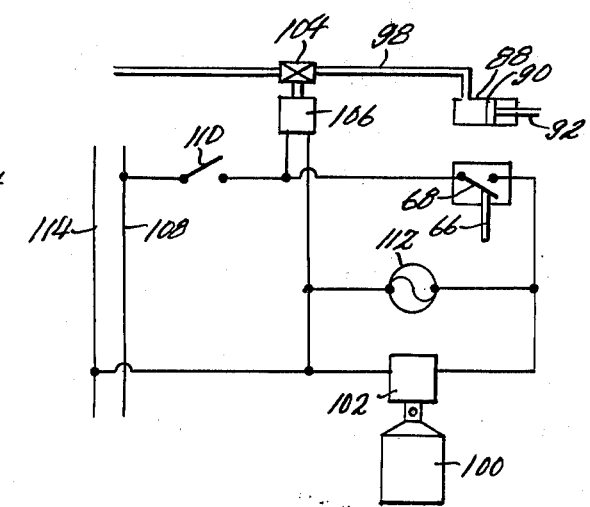

With these objects in view, as well as other objects which will appear in the course of the specification, reference will be had to the accompanying drawing, wherein:

FIG. 1 is a fragmentary side elevational view of a chain-type conveyor line, including a wear detector embodying the present invention, FIG. 2 is a sectional view taken on line II—II of FIG. 1, FIG. 3 is a fragmentary sectional view taken on line III—III of FIG. 1, FIG. 4 is a fragmentary sectional view taken on line IV—IV of FIG. 1, FIG. 5 is a top plan view of the elements shown in FIG. 1, partially broken away, FIG. 6 is an enlarged, horizontal sectional view of a section of the conveyor chain, FIG. 7 is a sectional view taken on line VII—VII of FIG. 6, FIG. 8 is a sectional view taken on line VIII—VIII of FIG. 7, FIG. 9 is an enlarged, fragmentary sectional view taken on line IX—IX of FIG. 1, and FIG. 10 is a schematic diagram of the control system of the device.

Like reference numerals apply to similar parts throughout the several views, and the numeral 2 applies to the conveyor track of a chain-type conveyor system. Said track has the form of an I-beam in cross-sectional contour, and is of course stationary, being supported from above at intervals by suitable hangers, not shown. Carried at regular intervals along the track are a continuous series of trolleys 4, each trolley consisting of a pair of coaxial roller wheels 6 supported on the lower flange of the track beam at respectively opposite sides of its web. Each wheel 6 is rotatably mounted at the upper end of a hanger bar 8, the hanger bars of the two wheels being brought into close laterally spaced apart relation beneath track 2 and extending downwardly, having a work-supporting element 10, such as a hook or the like, secured between their lower ends as by a bolt 12.

An endless conveyor chain 14 extends along track 2, spaced below and in parallel relation to said track, and is supported by hanger bars 8 of the trolleys. As shown, chain 14 consists of alternate links 16 and 18. Each link 16 comprises an endless elongated loop, opening vertically, the mid-portions of the side reaches thereof being reduced in vertical width by notches 20 thereof, as best shown in FIG. 7. Each link 18 comprises coextensive upper and lower plates 22, each plate having a longitudinally elongated slot 24 formed therethrough adjacent each of its ends. Each end of plates 24 overlap the ends of the adjacent links 16, and the links are pivotally connected at each juncture by a vertical pin 26 inserted through matching slots 24 of plates 22 and through an end loop of link 16. Each pin 26 is provided at each end with a T-head 28 which normally extends laterally of plates 22, and the pins are prevented from turning relative to said plates by lugs 30 formed on the distal sides of said plates. Pins 26 are normally held in the distal ends of the slots 24 of plates 22 of links 18 by tension on the chain, so that the chain parts are locked in assembly. However, if slack is introduced into the chain, and a pair of adjacent links 16 and 18 are pivoted into right-angled relation, the pin 26 at the juncture may be moved to the center of the link 16. Then the plates 22 of the link 18 may be moved closer together into notches 20 of link 16, sufficiently that lugs 30 clear the T-heads 28 of the pin, and the pin turned to align its T-heads with slots 24 of plates 22 of link 18, and removed. Thus the chain may be disassembled for convenience in replacing worn links wherever they may occur. Hanger bars 8 of each trolley 4 project downwardly through the mid-point of one of links 16, and are forced outwardly against the side reaches of said link by a spacer plate 32 (see FIG. 9) inserted therebetween and secured by bolts 34 both above and below the chain. Vertical slippage of the hanger bars in link 16 is prevented by lugs 36 formed on the distal sides of the hanger bars, above and below the chain. When bolts 34 and spacer plate 32 are removed, the hanger bars may be moved sufficiently close together that lugs 36 may pass through the chain link. Thus the trolleys may be disassembled from the chain.

The wear detection device contemplated by the present invention includes a horizontal mounting or base plate 38 welded or otherwise affixed to the top of track beam 2, and extending outwardly from both sides thereof. Depending from one longitudinal edge of plate 38, and affixed thereto, is a vertical plate 40. A short shaft 42 is disposed above base plate 38, extending parallel to the direction of chain travel (indicated by arrow 44 in FIG. 1) and being fixedly secured at its ends in pillow blocks 46 and 48 fixed to the top surface of base plate 38. Mounted on said shaft between said pillow blocks is a hub member 50, said hub being both rotatable and axially slidable on said shaft, being urged axially along said shaft in a direction opposite to chain travel by a spring 52 carried on the shaft between the hub and pillow block 46, and having its contact with pillow block 48 cushioned by a rubber washer 54 interposed therebetween.

Extending laterally from hub 50 toward and beyond the free edge 56 of base plate 38, and rigidly affixed to said hub, is a gauge arm 58. Said gauge arm is angled downwardly in outwardly spaced relation from the free edge of plate 38 and below track 2 and then angled inwardly at the level of the centerline of chain 14. Affixed to the lower end of said arm is a gauge member 60 constituting a normally generally horizontal plate configurated as best shown in FIG. 3. The inner edge thereof, parallel to the extent of the chain, is of a length less than the normal spacing between the confronting end loops of a pair of chain links 16, within the intervening link 18, as shown, and is taperingly broadened outwardly from said inner edge, as indicated by bevelled edges 62, to a width, longitudinally of the chain, greater than the maximum spacing which can be safely permitted between the ends of links 16. Thus when, during movement of the chain, one of links 18 comes opposite the gauge member, the weight of gauge arm 58, which may be quite substantial, forces hub 50 to pivot on shaft 42, in a clockwise direction as viewed in FIG. 2, to insert gauge member 60 into link 18 between upper and lower plates 22 thereof, until its tapered edges 62 engage between the confronting ends of the adjacent links 16, as shown in FIG. 3, whereupon insertion of the gauge is arrested. The greater the wear to which the end connections of the link being gauged have been subjected, the greater the spacing between the opposed ends of the adjacent links 16 will be, and the greater the insertion of gauge member 60 laterally into the chain will be.

Also affixed to hub 50, but extending oppositely to gauge arm 58, is a switch arm 64, the top surface of which is planar and parallel to the hub axis. As gauge member 60 is inserted into the chain as described, switch arm 64 moves upwardly, and if it moves far enough, indicating a dangerous degree of wear at the link being gauged, it engages the operating stem 66 of a micro-switch 68 carried at one end of a horizontal arm 70, whereby to close said switch to actuate the signalling and chain-marking devices, as will be described. Arm 70 extends above pillow block 48, and has a vertical stem 72 rotatably mounted therein. The lower end of said stem is threaded into pillow block 48, and its upper end carries a finger knob 74, as best shown in FIG. 4. By turning knob 74, the elevation of switch 68 and its operating stem 66 above switch arm 64 may be adjusted. This adjusts the "sensitivity" of the device, raising of the switch reducing the sensitivity by increasing the degree to which gauge member 60 can enter the chain before the danger signal is given, while lowering the switch increases the sensitivity in that the danger signal will be given on lesser degrees of chain wear. A smooth vertical pin 76 fixed at its upper end in arm 70 and slidably engaged at its lower end in a socket 78 formed therefor in pillow block 48, serves both to steady the action of screw stem 72, and also to prevent arm 70 from rotating about said screw stem.

In order to insure that the movement of gauge arm 58 is measuring actual insertion of gauge member 60 into the chain, unaffected by possible lateral displacement of the chain itself, there are provided a series of back-up rollers 80 at the side of the chain directly opposite from gauge member 60, also as best shown in FIG. 3. Said rollers are carried rotatably on vertical axes by brackets 82 affixed to depending plate 40 of base plate 38, and have a horizontal span at least as great as the length of a single link. They serve to hold the link of the chain being measured by gauge 60 firmly against horizontal displacement by the gauge.

When the gauge enters a chain link 18 as shown in FIG. 3, and the chain is moving, the chain forces the gauge to follow chain movement, to the left as viewed in FIGS. 1 and 3, sliding hub 50 to the left along shaft 42, against the pressure of spring 52. As the hub moves to the left, a roller 84 carried by gauge arm 58 for rotation on a vertical axis, and disposed at the level of free edge 56 of base plate 38, engages a portion 86 of the plate edge which is inclined outwardly in the direction of roller movement, and hence acts as a cam which pivots arm 58 outwardly as it moves to the left, moving gauge 60 laterally out of engagement with the chain. As soon as disengagement is accomplished, hub 50 is again moved to the right by spring 52, returning the gauge to its original position, with roller 84 out of engagement with cam 86, ready for engagement in the next link 18 to come opposite said gauge. Actually, the time required from engagement of the gauge in a chain link to its return by spring 52 is so short that upon return the gauge will come to rest against the side of link 16 next following the link 18 just gauged, and link 16 will slide past said gauge until the next following link 18 is aligned with said gauge. It will be seen that while gauge 60 enters only links 18, and not the alternate links 16, wear of all of the links is nevertheless indicated. This occurs since the wear is of course concentrated in the end connections between the links, and any wear of links 16, which occurs inside of the end loops or bights thereof, will also be reflected in an increase of the spacing between the ends of consecutive links 16.

To hold gauge arm 58 in a position pivoted sufficiently outwardly that gauge 60 is held out of engagement with the chain, when operation of the wear detector is not desired, there is provided a pneumatic cylinder 88 affixed to the top of base plate 38, between pillow blocks 46 and 48, and below shaft 42. Said cylinder extends transversely to track 2, and a piston 90 operable therein is affixed to a piston rod 92 which extends horizontally toward gauge arm 58, having a roller 94 carried at its outer end for rotation on a vertical axis. Piston 90 is normally retracted by a spring 96 (see FIG. 2) to such a position that roller 94 is not engaged with arm 58, and said arm functions as already described. However, when air is supplied to cylinder 88 through an air conduit 98, piston 90 is advanced against spring 96 to move roller 94 outwardly to engage gauge arm 58 and move gauge 60 out of engagement with the chain. Gauge arm 58 and switch arm 64 are both of such width, in a direction parallel to the track, that they are always disposed in alignment with roller 94 and switch operating stem 66, respectively, at all positions of hub 50 on shaft 42. Air is supplied to cylinder 88 in a manner to be described.

A container 100 of paint or the like, such as an ordinary aerosol can, is detachably connected, so that it may be replaced when exhausted, to an electrically actuated operator unit 102 mounted on the inner surface of vertical plate 40 opposite a link of chain 14 at the downtravel side of gauge 60. Such operators are known in the art and the operator structure is not here detailed, it being sufficient for present purposes to state that said operator is energized by closure of micro-switch 68, and when energized causes paint to spray from container 100 to coat chain 14 and mark it. Paint or other marking fluid capable of penetrating the oil or grease with which the chain is often coated is used. Since the gauge and paint container are disposed at different points of the chain, the paint may not be initially applied to the same link that gauge 60 has just indicated to be worn. However, the spray may be of such duration that paint is applied to the worn link, and in any event the paint mark, even if applied only to a single link, will be indexed in a known relationship to the worn link requiring replacement, so that the worn link is still reliably indicated. After the worn link is later replaced, the marks applied by container 100 are sprayed over by paint of another color, in order that the original mark will not be preserved to give a false indication that a replaced link is worn.

A control system for the device is diagrammed in FIG. 10. Air from a pressure source is supplied to air cylinder 88 by a conduit 98 through a normally open valve 104 which is closed by energization of an electric valve operator 106. Electric current from a line wire 108 is delivered to operator 106 through a manual on-off switch 110. Thus, closure of switch 110 causes operator 106 to close valve 104, allowing piston 90 of cylinder 88 to be retracted by spring 96, withdrawing roller 94 from gauge arm 58 and allowing gauge 60 to engage the chain. Closure of switch 110 also supplies current to micro-switch 68, which is normally open. Thus, whenever switch 68 is closed when the insertion of gauge 60 into any link of the chain is sufficiently great to indicate a condition of dangerous wear, switch 68 supplies current to electric operator 102 of paint conductor 100, causing a spray of paint to be applied to the chain as already described, and also to an audible or visible signal device 112, here represented as an electric lamp, causing it to emit a signal. Said signal device, as well as operators 102 and 106, have a common return to line wire 114. Opening of main switch 110 deactivates the entire system, refurnishing air to cylinder 88 to advance roller 94 to pivot gauge arm 58 outwardly.

The operation of the device is believed to have been fully described hereinabove. Gauge 60 is urged by gravity into each link 18 of the chain as it passes the gauge, its degree of insertion into the chain link, due to its tapered form, being proportionate to the spacing between the ends of the adjoining links 16, which in turn is proportionate to the increase in effective length of the link occasioned by the wearing of the end connections of the link, whether these end connections be pins 26 as shown, or otherwise. The device would function even in connection with a chain consisting entirely of closed-loop links, although since such a chain cannot be disassembled, wear indication as to individual links would serve little useful purpose. When the gauge insertion into a chain link is sufficiently great, reflecting advanced wear requiring replacement of the link, switch arm 64 engages operating stem 66 of switch 68, closing said switch to activate signal 112 and operator 102, whereby the chain is marked by paint from container 100. The sensitivity of the device, or the degree of wear of a chain link required to activate the signal, may be adjusted by turning knob 74. This adjustment may be affected, for example, by the design of the chain, or by the tensile load to which it is subjected in normal usage.

Since the gauging is preferably performed during actual normal operation of the conveyor line, while chain 14 is fully loaded, it is obviously impractical to stop the line to replace each worn link when the device first detects it, and furthermore this is not necessary from the standpoint of safety. For safety, it is quite adequate to replace the worn links during the next normal down period while the line is out of service. The importance of the marking or indexing of the worn links by paint from container 100 therefore becomes apparent. It clearly designates the links to be replaced to a workman at whatever point of the line it may be convenient to introduce slack into the chain for disassembly and replacement of links. Even under these circumstances, however, the automatic marking as shown and described is not essential. It is necessary to operate the detector device only during one full circuit of the chain in order to check all of its links. This may be done, say toward the close of a normal operating period of the conveyor line, with a workman manually applying a daub of paint to the affected link each time signal lamp 112 lights.

While I have shown and described a specific embodiment of my invention, it will be readily apparent that many minor changes of structure and operation could be made without departing from the spirit of the invention.

What I claim as new and desire to protect by Letters Patent is:

1. A wear detector in combination with a conveyor chain the links of which open transversely of the extent of said chain with the ends of the two links adjoining one link disposed in opposed relation across the opening of said one link, whereby wear of the connections between said links is reflected by an increase in the spacing, longitudinally of the chain, between said opposed ends of the adjoining links, said detector comprising:
   a. a base carried in a fixed position adjacent said chain,
   b. a gauge member carried by said base for movement transversely of said chain, and being biased toward said chain to be inserted into the transverse opening of one link of said chain, said gauge member being sufficiently thin transversely of said chain to enter said opening, and sufficiently broad longitudinally of said chain to engage the opposed ends of the two links adjoining said one link, said last named breadth being taperingly reduced in the direction of insertion of said gauge member into said link opening from a breadth too large to enter said opening when the chain is worn to a maximum safe degree, to a breadth small enough to enter said opening when said chain is not worn, whereby the degree of insertion of said gauge member into said link opening becomes progressively greater as the wear of said chain progresses, and
   c. signal means responsive to the degree of insertion of said gauge member into said link opening to emit a signal whenever said insertion exceeds a predetermined amount.

2. A detector as recited in claim 1 wherein said gauge member is mounted on said base in an unbalanced condition, whereby it is biased toward said chain by gravity.

3. A detector as recited in claim 1 for use in connection with a continuously moving conveyor chain, said gauge member being mounted on said base for movement parallel to the movement of said chain as well as transversely thereto, said movement parallel to the chain being from a normal position in the direction of chain movement, whereby said gauge member, once inserted in a link of the chain, is moved with said chain, and with the addition of:

a. disengaging means carried by said base and operable during said movement of said gauge member in the direction of chain movement to disengage said gauge member laterally from said chain link opening, and
   b. resilient means operable when said disengagement is accomplished to return said gauge member to its normal position in a direction opposite to that of chain travel.

4. A detector as recited in claim 3 wherein the disengagement of said gauge member from said chain by said disengaging means, and its return to normal position by said resilient means, is accomplished in a time less than that required for the chain to move a distance equal to the combined length of two links thereof, whereby said gauge member is caused to be inserted into alternate links of the chain, thereby effecting a measurement of wear of the end connections of all of the links of the chain.

5. A detector as recited in claim 1 with the addition of back-up rollers disposed at the side of said chain opposite to that into which said gauge member is inserted, and against which said chain is supported at the link into which said gauge member is inserted, whereby the apparent gauge reading will be true, not affected by bodily transverse displacement of the chain.

6. A detector as recited in claim 1 wherein said signal means includes means operable to adjust the degree of insertion of said gauge member into a link opening of said chain required to actuate said signal means.

7. A detector as recited in claim 1 with the addition of chain marking means carried by said base and operable to place a mark on the chain whenever it is actuated, said marking means beng actuated by actuation of said signal means.

8. A detector as recited in claim 7 wherein said marking means constitutes a spray container of marking fluid directed laterally toward said chain, and an electrically actuated operator which when energized causes said spray container to spray said marking fluid on a portion of chain having a fixed relation to the link of said chain being measured by said gauge device, said operator being energized responsively to insertion of said gauge member into a link of said chain to a degree greater than a predetermined amount.

9. A detector as recited in claim 8 wherein said signal means includes an electric lamp, said spray operator and said lamp being connected in parallel in an operative electric circuit including a normally open control switch operable to be closed in response to insertion of said gauge member into a link of said chain to greater than a predetermined degree.

10. A detector as recited in claim 9 with the addition of a pneumatic cylinder operable when supplied with air under pressure to move said gauge member away from said chain against its bias toward said chain, a normally open valve controlling the flow of pressure air to said cylinder, and an electrically actuated valve operator operable when energized to close said valve, said valve operator being connected in parallel with said lamp in said operative electric circuit.

* * * * *